United States Patent [19]  
Kiss et al.

[11] 4,066,610  
[45] Jan. 3, 1978

[54] STABILIZED PIGMENTED POLYOLEFIN COMPOSITIONS

[75] Inventors: Kornel Dezso Kiss, Yonkers, N.Y.; John Leslie Hugh Allan, Glen Rock; Marvin Michael Fein, Westfield, both of N.J.

[73] Assignee: Dart Industries, Inc., Los Angeles, Calif.

[21] Appl. No.: 705,233

[22] Filed: July 14, 1976

[51] Int. Cl.² ............................................. C08K 5/22
[52] U.S. Cl. .......................... 260/42.21; 260/45.9 NC
[58] Field of Search ..................... 260/45.9 NC, 42.21

[56] References Cited

U.S. PATENT DOCUMENTS

| | | | |
|---|---|---|---|
| 3,584,047 | 6/1971 | Dexter et al. | 260/45.9 NC |
| 3,773,722 | 11/1973 | Dexter et al. | 260/45.9 NC |
| 3,787,355 | 1/1974 | Lihart et al. | 260/45.9 NC |
| 3,933,737 | 1/1976 | Glander et al. | 260/45.9 NC |

OTHER PUBLICATIONS

Modern Plastics Encyclopedia 1967, Sept. 1966, vol. 44, No. 1A, p. 461.

*Primary Examiner*—James H. Derrington  
*Attorney, Agent, or Firm*—Margareta LeMaire; Bryant W. Brennan; F. S. Valles

[57] ABSTRACT

Polyolefins pigmented with copper phtalocyanine complexes are rendered stable against heat and oxidation by addition of a metal chelating agent.

17 Claims, No Drawings

STABILIZED PIGMENTED POLYOLEFIN COMPOSITIONS

BACKGROUND OF THE INVENTION

Copper phtalocyanine pigments are extremely light stable pigments, which range in color from vivid blues to greens. In addition, these pigments exhibit very high chemical and heat stabilities. Because of their stabilities and their attractive, natural looking colors, they are being used extensively as a colorant in a variety of plastic articles of manufacture intended for outdoor use, for instance, in outdoor carpeting and in synthetic turfs. In these applications, the plastic resin is usually a polyolefin resin, especially a polypropylene based resin.

Usually the outdoor carpetings and turfs are permanently installed for the purpose of simulating grass in locations where natural growth is impractical due to wear, or climatic conditions, e.g. excessive heat and sunlight, or a combination thereof. In order to prevent degradation of the polymer resins to heat, exposure to air and sunlight, various stabilizers such as antioxidants and UV stabilizers are incorporated into said resins. Although the average useful life of the pigmented resin is improved by the incorporation of the abovementioned stabilizers, a further improvement would be most desirable.

It is therefore a main object of the present invention to provide a polyolefin resin pigmented with copper phtalocyanine pigments having an improved stability against deterioration due to heat and oxygen.

Other objects will become apparent from the detailed description and appended claims.

THE INVENTION

In accordance with the present invention there is provided a pigmented polymeric composition comprising
- a. a polyolefin resin
- b. a copper phtalocyanine pigment and
- c. from about 0.01 to about 10 percent of at least one metal chelating agent based on the weight of the polyolefin resin.

During the course of the investigation leading up to the invention it was found, that deterioration or premature aging of polyolefin resins pigmented with copper phtalocyanine compounds was caused to a great extent by the presence of the pigment and in particular to the presence of copper in the pigment. This was completely unexpected since the copper atom is held within the phtalocyanine molecule in a manner, which would not be expected to render it effective in degrading the polyolefin resin when exposed to heat and oxygen. More specifically, the central copper atom is held by secondary valences of the nitrogen atoms of the four isoindole groups in the phtalocyanine molecule, and therefore the copper is in chelated form. However, according to the prior art, the presence of copper in chelated form should not materially decrease the stability of a polymeric resin when exposed to heat and oxygen, in fact, whenever polyolefin resins are to be used in direct contact wuth copper metal or alloys of copper, it is indeed the practice to incorporate a metal chelating agent into the resin for the purpose of inhibiting the known detrimental effect of said copper metal or copper alloys on the resin stability.

The polyolefin resin component of the composition of this invention comprises solid, substantially crystalline polyolefins including homopolymers and copolymers of α-olefins having 2 to 18 carbon atoms and blends thereof. Among the preferred polyolefins are the polypropylene based resins containing at least 60 percent by weight, preferably at least 75 percent polymerized propylene groups. Specific examples of suitable propylene copolymers are those derived from propylene and another α-olefin having from 2 to 18 carbon atoms. Other comonomers include vinyl chloride, and crosslinkable monomers such as cyclopentadiene, ethylidine norbornene, trans-1,5-hexadiene and the like. Graft copolymers, including maleic anhydride, vinyl pyridene and vinyl pyrrolidone grafted polypropylenes and the like are also suitable as the resin component of the composition of this invention.

The copper phtalocyanine pigment can be any one of the various pigments including unsubstituted as well as the halogenated or sulfonated copper phtalocyanines. Usually these pigments are present in the composition in amounts ranging from 0.1 to about 10 percent by weight based on the polymer resin.

The chelating agent can be one of the multitude of chelating agents known in the art. It is incorporated into the compositions in amounts broadly ranging from 0.01 to about 10 percent by weight of the polyolefin resins and preferably from about 0.1 to about 5 percent.

Although not so limited, the chelating agent component of the compositions of this invention is advantageously a compound generally described by the following chemical formula Z-NH-Y-NH-Z, in which Z is represented by the formula

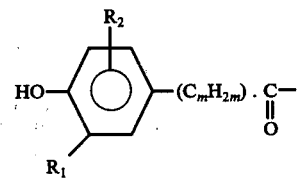

wherein $R_1$ and $R_2$ each is a lower alkyl group of from 1 to 6 carbon atoms, $m$ is an integer from 0 to 6 and preferably 2, and Y is selected from
- a. $C_nH_{2n}$
  where $n$ is an integer from 0 to 18, preferably 0 to 6 and most preferably is 2; or
- b. $(C_pH_{2p}\text{-}NH)_r\text{-}C_pH_{2p}$
  where $p$ and $r$ independently each is an integer from 1 to 12. Preferably, $p$ has a value from 2 to 6 and $r$ is between 1 and 6. Most preferably, the value of $p$ is 2.

In the above formula it is also preferred that the lower alkyl groups $R_1$ and $R_2$ are tertiary alkyl groups in the 3,5 position of the phenyl group, i.e., both alkyl groups are located in the ortho positions with respect to the hydroxyl group.

The aforementioned compounds can be prepared by any suitable technique, e.g. by reaction of an acid chloride having the formula Z-Cl, where Z is as defined above, with either hydrazine or a polyamine in an inert solvent and preferably in the presence of an organic or inorganic base as an acceptor for liberated hydrogen chloride. Obviously, the particular choice of hydrazine or polyamine will be determined by the desired chemical structure of group segments -NH-Y-NH- of the formula above.

In addition to a chelating agent, the compostions of this invention can also contain other additives, such as antioxidants UV stabilizers, synergists, lubricants, plasticizers, fillers, etc. It has been found, that when stabilizers defined by formula I above are used, there is no need to include antioxidants in the formulation, since these chelating agents also function as excellent antioxidant stabilizers due to the presence of the acyl moieties Z in the molecular structure. The use of auxiliary antioxidants in the compositions is, however, within the scope of the invention.

For a better understanding of the invention the following examples are presented.

EXAMPLE 1

This example demonstrates a method generally applicable in the preparation of a metal chelating agent having the formula $Z-NH-C_nH_{2n}-NH-Z$, where Z and n are as defined above. About 0.02 moles of $\beta$-(3,5-di-t-butyl-4-hydroxy phenyl) propionyl chloride was dissolved in 25 ml methylene chloride and this solution was then added to a stirred mixture containing a solution of 0.01 mole ethylene diamine in 125 ml methylene chloride and 25 ml of a 10% sodium carbonate solution in water. After one hour, the methylene chloride layer was separated, washed with water, dried over anhydrous magnesium sulfate and then evaporated to dryness yielding a solid product having a melting point in the range from 195°–201° C. Recrystallization from methyl alcohol have 1,2-bis[$\beta$-(3,5-di-t-butyl-4-hydroxy phenyl) propionamido] ethane as a white solid having a melting point of 209°–211° C.

Using techniques similar to the one described above 1,4-bis[$\beta$-(3,5-di-t-butyl-4-hydroxy phenyl) propionamido] butane (M.P. 203°–205° C); 1,8-bis[$\beta$-(3,5-di-t-butyl-4-hydroxy phenyl) propionamido] octane (M.P. 94.5°–96° C); and 1,12-bis[$\beta$-3,5-di-t-butyl-4-hydroxy phenyl) propionamido] dodecane (M.P. 89°–92° C) were prepared by reaction of $\beta$-(3,5-di-t-butyl-4-hydroxy phenyl) propionyl chloride with respectively 1,4 diamino butane, 1,8-diamino octane and 1,12-diamino dodecane.

Also, when reacting $\beta$-(3,5-di-t-butyl-4-hydroxy phenyl) propionyl chloride with hydrazine hydrate, the resulting product is N,N'-bis[-$\beta$-(3,5-di-t-butyl-4-hydroxy phenyl) propionyl] hydrazine having a melting point between 227° and 229° C.

EXAMPLE 2

The technique of this example is applicable to preparations of chelating agents of the general formula $Z-NH-(C_pH_{2p}\cdot NH)_r\cdot C_pH_{2p}-NH-Z$, wherein Z, p and r are as defined before.

0.02 moles $\beta$-(3,5-di-t-butyl-4-hydroxy phenyl) propionyl chloride in 25 ml methylene chloride was added to a stirred mixture containing a solution of 0.02 mol triethylene tetramine in 125 ml methylene chloride and 25 ml 10% sodium carbonate. The mixture was stirred for two hours and then separated. The methylene chloride layer was washed with 5% sodium carbonate solution and then with water, subsequently dried over anhydrous magnesium sulfate and finally evaporated to dryness. A resinous material of 1,8-bis[$\beta$-(3,5-di-t-butyl-4-hydroxy phenyl) propionamido]-3,6-diazaoctane resulted which was pulverized to give a light brown solid having a melting point of 80°–110° C.

EXAMPLE 3

Comparative experiments were conducted to demonstrate the degrading effect of a copper phtalocyanine pigment (GT 751D available from DuPont) on polypropylene stability, and the ability of a metal chelating agent to deactivate the pigment. N,N'-bis-$\beta$[-(3,5-di-t-butyl-4-hydroxy phenyl) propionyl] hydrazine, was used as the chelating agent of compositions D-I, while 1,2-bis[$\beta$-(3,5-di-t-butyl-4-hydroxy phenyl) propionamido] ethane was employed in composition J and 1,8-bis[$\beta$-(3,5-d-t-butyl-4-hydroxy phenyl) propionamido]-3,6-diazaoctane in composition K. Samples of a fiber grade propylene homopolymer were compounded with the pigment and the chelating agent at 210° C for 5 minutes in the proportions shown in TABLE I. Each of the blended samples was compression molded into 6 inches ×6 inches ×10 mil plaques at 400° F and 25,000 p.s.i.g. for 60 seconds. The plaques were then rapidly cooled at high pressure, and then cut into ½ × 2 × 10 mil strips for evaluation of stability using long term heat aging tests (LTHA) at 150° C and 160° C. In these tests five strips of each plaque were placed on glass sheets and put into a Model 625A Freas forced draft oven maintained at test temperature. The strips were checked periodically during the first day and then daily thereafter for signs of failure. The pertinent data are shown in TABLE I below.

TABLE I

| | Stability of Pigmented PP | | | |
| | % Additive | | LTHA Stability, hrs. | |
| Experiment | Stabilizer | Pigment | 150° C. | 160° C. |
|---|---|---|---|---|
| A | — | — | 568 | 170 |
| B | — | .25 | 166 | 48 |
| C | — | .5 | 144 | 32 |
| D | .1 | — | 859 | 312 |
| E | .1 | .25 | 605 | 158 |
| F | .1 | .5 | 563 | 168 |
| G | .2 | — | 854 | 322 |
| H | .2 | .25 | 830 | 221 |
| I | .2 | .5 | 710 | 219 |
| J | .1 | .25 | 936 | 312 |
| K | .1 | .25 | 984 | 360 |

As seen from the data of Experiments A, B ad C the inclusion of the pigment into unstabilized polypropylene causes 75–80% reduction in the stability of the resin. A comparison of the data of Experiments A, D and G shows, as expected, that in the absence of the pigment, the stability of the polypropylene was increased when the chelating agent was included due to the antioxidant property of the acyl moieties of the chelating agent. The compositions of Experiments E, F, H and I which were pigmented as well as stabilized exhibited excellent stabilities. Although the LTHA values were somewhat lower than those of the corresponding unpigmented compositions, the results of E, F, H and I clearly demonstrate the desirable inhibiting effect of the stabilizer on the pigment.

Experiment J and K demonstrate the superior results had with the most preferred stabilizers of this invention, i.e., those prepared by reaction of an alkyl hydroxy phenyl alkanoic acid chloride and a polyamine.

It is obvious to those skilled in the art that many variations and modifications can be made to the compositions of this invention.

All such departures from the foregoing specification are considered within the scope of this invention as defined by this specification and appended claims.

What is claimed is:

1. The method of reducing the detrimental effect of a copper phthalocyanine pigment on the stability of a polyolefin resin pigmented with said copper phthalocyanine, which comprises:
  including in the pigmented resin from about 0.01 to about 10 percent of at least one metal chelating agent based on the weight of the polyolefin resin.

2. The method of claim 1 containing from about 0.1 to about 5 percent by weight of the chelating agent.

3. The method of claim 1 wherein the polyolefin resin is selected from homopolymers and copolymers of at least one α-olefin having from 2 to 18 carbon atoms.

4. The method of claim 3 wherein the polyolefin resin is derived at least in part from propylene monomer.

5. The method of claim 1, wherein the chelating agent is a compound having the general structure Z-NH-Y-NH-Z, in which Z is an acyl group represented by the formula

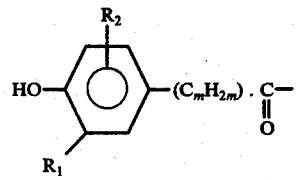

wherein $R_1$ and $R_2$ is a lower alkyl group of from 1 to 6 carbon atoms and $m$ is an integer from 0 to 6, and Y is a group selected from a. $C_nH_{2n}$, in which $n$ is an integer from 0 to 18, or
b. $(C_pH_{2p}\cdot NH)_r\cdot C_pH_{2p}$, in which $p$ and $r$ each is an integer from 1 to 12.

6. The method of claim 5 in which $R_1$ and $R_2$ are tertiary alkyl groups.

7. The method of claim 5 in which $R_1$ and $R_2$ are in the ortho positions with respect to the hydroxyl group.

8. The method of claim 5 in which the value of $m$ is 2.

9. The method of claim 5 in which $n$ is an integer from 0 to 6.

10. The method of claim 5, in which $n$ is 2.

11. The method of claim 5, in which $p$ is an integer from 2 to 6.

12. The method of claim 5, in which $r$ is an integer from 1 to 6.

13. The method of claim 5, in which $p$ is 2.

14. The method of claim 5 containing the chelating agent as the sole stabilizer to prevent oxidative degradation of the polymer.

15. The method of claim 5, wherein the chelating agent is N,N'-bis[-β-(3,5-di-t-butyl-4-hydroxy phenyl) propionyl] hydrazine.

16. The method of claim 5, wherein the chelating agent is 1,2-bis[β-(3,5-di-t-butyl-4-hydroxy phenyl) propionamido] ethane.

17. The method of claim 5, wherein the chelating agent is 1,8-bis[β-(3,5-di-t-butyl-4-hydroxy phenyl) propionamido]-3,6-diazaoctane.

* * * * *